(12) United States Patent
Kong et al.

(10) Patent No.: US 11,016,525 B1
(45) Date of Patent: May 25, 2021

(54) CLOCK CONTROL CIRCUIT AND CLOCK CONTROL METHOD

(71) Applicant: Shenzhen Intellifusion Technologies Co., Ltd., Guangdong (CN)

(72) Inventors: Qinghai Kong, Guangdong (CN); Wei Li, Guangdong (CN)

(73) Assignee: Shenzhen Intellifusion Technologies Co., Ltd., Guangdong (CN)

( * ) Notice: Subject to any disclaimer, the term of this patent is extended or adjusted under 35 U.S.C. 154(b) by 0 days.

(21) Appl. No.: 17/256,657

(22) PCT Filed: Oct. 30, 2019

(86) PCT No.: PCT/CN2019/114441
§ 371 (c)(1),
(2) Date: Dec. 29, 2020

(87) PCT Pub. No.: WO2020/134531
PCT Pub. Date: Jul. 2, 2020

(30) Foreign Application Priority Data

Dec. 29, 2018 (CN) .......................... 201811641843.4

(51) Int. Cl.
*G06F 1/06* (2006.01)
*G06F 1/24* (2006.01)
*G06F 1/08* (2006.01)

(52) U.S. Cl.
CPC .................. *G06F 1/08* (2013.01); *G06F 1/06* (2013.01); *G06F 1/24* (2013.01)

(58) Field of Classification Search
CPC ..................................... G06F 1/08; G06F 1/06
See application file for complete search history.

(56) References Cited

U.S. PATENT DOCUMENTS

| | | | | |
|---|---|---|---|---|
| 6,333,646 B1* | 12/2001 | Tsuzuki | ................. | G01R 31/30 327/47 |
| 7,039,823 B2* | 5/2006 | Hales | ........................ | G06F 1/24 713/400 |
| 2003/0052708 A1* | 3/2003 | Momtaz | .................... | G06F 5/10 326/37 |
| 2007/0283183 A1* | 12/2007 | Komoto | .................... | G06F 1/06 713/500 |

(Continued)

FOREIGN PATENT DOCUMENTS

CN 101021739 A 8/2007

*Primary Examiner* — Phil K Nguyen (57) ABSTRACT

A clock control circuit includes a clock source, a reset signal source, a register group with a plurality of first registers, and a clock control unit including a clock adjusting module and a clock gating. wherein a first receiving end of the clock adjusting module is connected to the clock source, a second receiving end of the clock adjusting module is connected to the reset signal source; a first receiving end of the clock gating is connected to an output end of the clock adjusting module, a second receiving end of the clock gating is connected to the clock source, an output end of the clock gating is connected to one end of the register group, and the other end of the register bank is connected to the reset signal source. Reset of the register group in the circuit is not limited by one clock period to avoid circuit function errors and power consumption, and have high applicability.

10 Claims, 2 Drawing Sheets

(56) References Cited

U.S. PATENT DOCUMENTS

2014/0050294 A1* 2/2014 Cao .................. G11C 19/28
377/54
2014/0168049 A1* 6/2014 Gu .................. G09G 3/3685
345/100
2017/0364170 A1* 12/2017 Gu .................... G09G 3/36

* cited by examiner

FIG. 1

```
┌─────────────────────────────────────────────────────────────┐
│ Outputting a first clock signal by a clock source built in a terminal and a │ ── S201
│     reset signal by a reset signal source built in a terminal              │
└─────────────────────────────────────────────────────────────┘
                              │
                              ▼
┌─────────────────────────────────────────────────────────────┐
│ When the reset signal received by a clock adjusting module built in the    │
│ terminal, the clock adjusting module configured to control a clock gating  │
│ built in the terminal to adjust a first clock signal to a second clock signal, │ ── S202
│ after each register of a register group receiving the reset signal and     │
│                completed to reset the reset signal                         │
└─────────────────────────────────────────────────────────────┘
                              │
                              ▼
┌─────────────────────────────────────────────────────────────┐
│ The clock adjusting module configured to control the clock gating built in the │ ── S203
│ terminal to output the second clock signal to the register group built in the  │
│                            terminal                                        │
└─────────────────────────────────────────────────────────────┘
```

CLOCK CONTROL CIRCUIT AND CLOCK CONTROL METHOD

CROSS-REFERENCE TO RELATED APPLICATION

This application claims priority to Chinese Patent Application No. 201811641843.4, entitled "CLOCK CONTROL CIRCUIT AND CLOCK CONTROL METHOD" and filed on Dec. 29, 2018, the content of which is hereby incorporated by reference in its entirety.

BACKGROUND

1. Technical Field

The present disclosure generally relates to electronic technologies field, and especially relates to a clock control circuit and a clock control method.

2. Description of Related Art

A clock is an important part of a digital circuit. As long as there is a sequential circuit, it can't be separated from the clock. Therefore, a clock design is a foundation of more and more complex multifunctional digital circuits, which directly affects performance of the digital circuits. Due to continuous development of modern electronic technologies, an application of the clock is becoming more and more widely. In digital circuit designs, number of registers for a general reset signal load is very large (tens of thousands or even hundreds of thousands), especially for high-speed designs, it takes a long duration for reset signals to be transferred to each register, perhaps more than one clock cycle, so that some registers can be reset/released in a single cycle, while other registers can't be reset/released in the single cycle, thereby leading to function errors and resulting in design frequency reduction.

In addition, even though the reset is controlled within one cycle by means of timing optimization, however, because sequence of reset paths is relatively tight, a standard battery with a high speed and a large leakage is selected in an optimization process, which can lead to increase an area and power consumption, and low applicability.

SUMMARY

The technical problems to be solved: in view of the shortcomings of the related art, the present disclosure provides to a clock control circuit and a clock control method, which can make a register group of a circuit to be reset without a clock cycle requirement, avoid abnormal logic function in the circuit, and have high applicability.

In a first aspect, a clock control circuit according to an embodiment of the present disclosure includes: a clock source, a reset signal source, a register group, and a clock control unit including a clock adjusting module and a clock gating;

a first receiving end of the clock adjusting module connected to the clock source, and a second receiving end of the clock adjusting module connected to the reset signal source; a first receiving end of the clock gating connected to an output end of the clock adjusting module, a second receiving end of the clock gating connected to the clock source, an output end of the clock gating connected to one end of the register group, and the other end of the register group connected to the reset signal source, wherein the register group comprises a plurality of first registers;

after the clock adjusting module receives a reset signal output by the reset signal source, the clock adjusting module is configured to control the clock gating to adjust a first clock signal into a second clock signal, and after each of the plurality of first registers of the register group receiving the reset signal output by the reset signal source and completed to be reset, and the clock adjusting module configured to control the clock gating to output the second clock signal to the register group.

In an embodiment of the present disclosure, by the clock control circuit providing the clock control unit, the clock signal can be output to the register group after the register group in the control circuit are completed to be reset, therefore, it can solve a problem that each first register of the register group in a conventional circuit can't be reset completely in one clock cycle, and avoid circuit logic error caused by differences of reset durations of a plurality of registers in the register group, and avoid circuit frequency reduction and power consumption increase, and have high applicability.

In combination with the first aspect, in a possible implementation, the clock adjusting module further includes a data source and N second registers, wherein N is an integer greater than 1;

a clock input end of each second register connected to the clock source, and a reset signal input end of the each second register connected to the reset signal source, a data input end of a first second register connected to the data source, a data input end of a I-th second register connected to a data output end of a (I−1)-th second register, a data output end of a N-th second register connected to a data input end of the clock gating, wherein 1<I≤N.

In an embodiment of the present disclosure, by controlling an amount of registers of the clock control module in the clock control circuit, it can appropriately increase or decrease a duration that the first clock signal is adjusted to the second clock signal by the clock control unit, according to a specific number and a connection mode of the register group in the clock control circuit, the clock adjustment module in the clock control circuit can be dynamically adjusted, thereby flexibility and operability of the clock control circuit provided in the embodiment of the present disclosure can be enhanced, and be of higher applicability.

In combination with the first aspect, in a possible implementation, after the clock adjusting module receives the reset signal, the clock adjusting module is configured to reset the N registers;

when a J-th second register is completed to be reset, the J-th second register is triggered by the first clock signal in a J-th clock cycle, data received by a data input end of the J-th second register is output from a data output end of the J-th second register to a data input end of a (J+1)-th second register, wherein 1≤J<N;

when the N-th second register is completed to be reset, the N-th second register is triggered by the first clock signal in a N-th clock cycle, data received by a data input end of the N-th second register is output from a data output end of the N-th second register to the first receiving end of the clock gating.

In an embodiment of the present disclosure, the first clock signal is provided for controlling a transmission mode that data output from the data source of the clock adjusting module in the clock control circuit in each register, so that the data output from the data source can be transferred in the registers of the clock adjusting module in order, and then the first clock signal can be determined as the second clock signal at an exact moment. It not only can ensure transmission stability of the first clock signal between the registers in the clock adjusting module, but also can maximize to ensure accuracy of adjusting the first clock signal to the second clock signal, therefore, the clock control circuit provided in the embodiment of the present disclosure has higher stability.

In combination with the first aspect, in a possible implementation, when the first receiving end of the clock gating receives the data output from the N-th second register, the clock gating is configured to take the first clock signal after the N-th clock cycle as the second clock signal and output to the register group.

In an embodiment of the present disclosure, the clock gating is controlled to be turned on by the data output from the data source, which can more stably output the second clock signal to the register group in the clock control circuit. At the same time, the second clock signal is output to the register group in the clock control circuit by the clock gating, so as to avoid a situation that the second clock signal is occurred signal reversal. To the greatest extent, the register groups in the clock control circuit can be ensured to simultaneously work, thus effectively improving stability of logic functions of the clock control circuit.

In combination with the first aspect, in a possible implementation, the number N of the second register in the clock adjusting module is determined by a target duration that the reset signal is received by a target first register in the register group and the target first register is completed to be reset, and a duration that the data output from the data source is transferred from the first second register to the N-th second register and then is transferred from the N-th second register to the clock gating is not less than the target duration; and wherein the target first register is the first register in the register group with the longest duration that receives the reset signal and is completed to be reset, when the target first register is completed to be reset, the rest first registers of the register group except the target first register is completed to be reset.

In an embodiment of the present disclosure, the duration that the data output from the data source is transferred from the first second register to the N-th second register and then is transferred from the N-th second register to the clock gating is not less than the target duration that the reset signal is received by the target first register in the register group and the target first register is completed to be reset. In this way, when a number and a connection mode of the first register of the register group in the clock control circuit are changed, a basis for adjusting number of the second registers of the clock control unit in the clock control circuit can be provided. At the same time, it can achieve a purpose of outputting the second clock signal after the second registers in the register group are completed to be reset.

In combination with the first aspect, in a possible implementation, the clock control circuit further includes a filter circuit, wherein a receiving end of the filter circuit connected to the reset signal source, a first output end of the filter circuit connected to the second receiving end of the clock adjusting module, and the output end of the filter circuit further connected to the other end of the register group; and after outputting the reset signal by the reset signal source, the filter circuit configured to eliminate burrs generated by the reset signal before and/or when the reset signal is powered on, to obtain the reset signal after the burrs are eliminated.

In an embodiment of the present disclosure, by setting the filter circuit to remove burrs of the reset signal generated by the reset signal source, signal stability of the reset signal can be greatly improved. Especially in a high-speed reset clock control circuit, stable reset signals can ensure the clock control circuit to work more stably and have high applicability.

In a second aspect, a clock control method according to an embodiment of the present disclosure is applied to a terminal including the clock control circuit provided in any of possible implementations of the first aspect and/or the first aspect, the method includes;

outputting a first clock signal by a clock source built in the terminal, and outputting a reset signal by a reset signal source built in the terminal;

when the reset signal received by a clock adjusting module built in the above terminal, the clock adjusting module configured to control a clock gating built in the terminal to adjust a first clock signal to a second clock signal; and after each register of a register group built in the terminal receiving the reset signal and completed to be reset; and the clock adjusting module configured to control the clock gating built in the terminal to output the second clock signal to the register group built in the terminal.

In an embodiment of the present disclosure, the clock control unit is provided by the terminal for enabling the clock signal to output to the register group after the register group built in the terminal has been completed to be reset, therefore, it can solve a problem that each register of the register group in a conventional circuit built in the terminal can't be reset completely in one clock cycle, and avoid circuit logic error caused by differences of reset durations of a plurality of registers in the register group, and avoid circuit frequency reduction and power consumption increase, and have high applicability.

In combination with the first aspect, in a possible implementation, the step of the clock adjusting module configured to control the clock gating built in the terminal to output the second clock signal to the register group built in the terminal, includes:

after the clock gating built in the terminal receives data output by the clock adjusting module built in the terminal, the clock gating built in the terminal configured to take the first clock signal as the second clock signal and output to the register group built in the terminal;

the clock adjusting module built in the terminal including a data source, and N second registers configured to receive data output from the data source and then output the data to the clock gating, wherein N is an integer greater than 1.

In an embodiment of the present disclosure, by controlling the clock gating, the terminal can adjust the first clock signal to the second clock signal and output the second clock signal to the register group built in the terminal, the duration that the clock gating built in the terminal is configured to output the second clock signal to the register group built in the terminal can be determined. At the same time, the second clock signal is output by the clock gating, it not only can improve stability of the clock adjusting module built in the terminal, but also can avoid terminal malfunctions caused by signal reversal of the second clock signal.

In combination with the first aspect, in a possible implementation, wherein the number N of the second register in the clock adjusting module built in the terminal is determined by a target duration that the reset signal is received by a target first register in the register group and the target first register is completed to be reset, and a duration that the data output from the data source is received by the N second registers and then transferred from the N second registers to the clock gating built in the terminal is not less than the target duration; and wherein the target first register is the first register in the register group with the longest duration that receives the reset signal and is completed to be reset, when the target first register is completed to be reset, the rest first registers of the register group except the target first register is completed to be reset.

In an embodiment of the present disclosure, the duration that the data output from the data source is received by the N second registers and then transferred from the N second registers to the clock gating built in the terminal is controlled to not less than the duration that the register group in the terminal have been completed to be reset, it can ensure that the terminal is configured to output the second clock signal to the register group, after each of the registers of the register group built in the terminal is completed to be reset, thereby the terminal can be ensured to work more stability.

In combination with the first aspect, in a possible implementation, wherein the method further includes:

obtaining the target duration that the reset signal is received by the target first register of the register group built in the terminal and completed to be reset;

obtaining a transmission duration that the data received by one of the second registers of the clock adjusting module built in the terminal and then output by the one of the second registers;

determining the number N of the second registers in the clock adjusting module based on the target duration and the transmission duration; and wherein a duration that the data from being received by a first second register in the clock adjusting module to output by a N-th second register in the clock adjusting module is not less than the target duration.

In an embodiment of the present disclosure, by obtaining the target duration that the reset signal is received by the target first register of the register group built in the terminal and completed to be reset, and obtaining the transmission duration that data received by one of the second registers of the clock adjusting module built in the terminal and then output by the one of the second registers; and a specific number of the second registers can be obtained by comparison calculation. At the same time, after number of the second registers is determined, the clock gating can be further guaranteed to open and output the second clock signal after each of the first registers in the register group is completed to be reset, thereby working stability and effectiveness of the clock control circuit built in the terminal can be ensured.

In a third aspect, a terminal according to an embodiment of the present disclosure includes a clock control circuit provided in any of possible implementations of the first aspect and/or the first aspect, the terminal configured to perform the method provided by any of possible implementations of the second aspect and/or the second aspect.

In a fourth aspect, a computer readable storage medium according to an embodiment of the present disclosure is configured to store computer programs, the computer programs including instructions performed by a processor to implement the method provided by any of possible implementations of the second aspect and/or the second aspect.

BRIEF DESCRIPTION OF THE DRAWINGS

In order to more clearly understand the technical solution hereinafter in embodiments of the present disclosure, a brief description to the drawings used in detailed description of embodiments hereinafter is provided thereof. Obviously, the drawings described below are some embodiments of the present disclosure, for one of ordinary skill in the related art, other drawings can be obtained according to the drawings below on the premise of no creative work.

DETAILED DESCRIPTION

A clock control circuit and a clock control method provided in embodiments of the present disclosure are suitable for circuits with a multi-register reset in high-speed designs of each digital circuit, it can ensure that all registers in a clock domain are reset before receiving a clock signal, and a reset completion duration of the registers in the clock domain is no longer limited to in a clock cycle, which can help to reduce probability of abnormal logic functions in the circuit.

A clock control circuit and a clock control method according to embodiments of the present disclosure are described below in combination with FIGS. 1-4.

Figure 1:
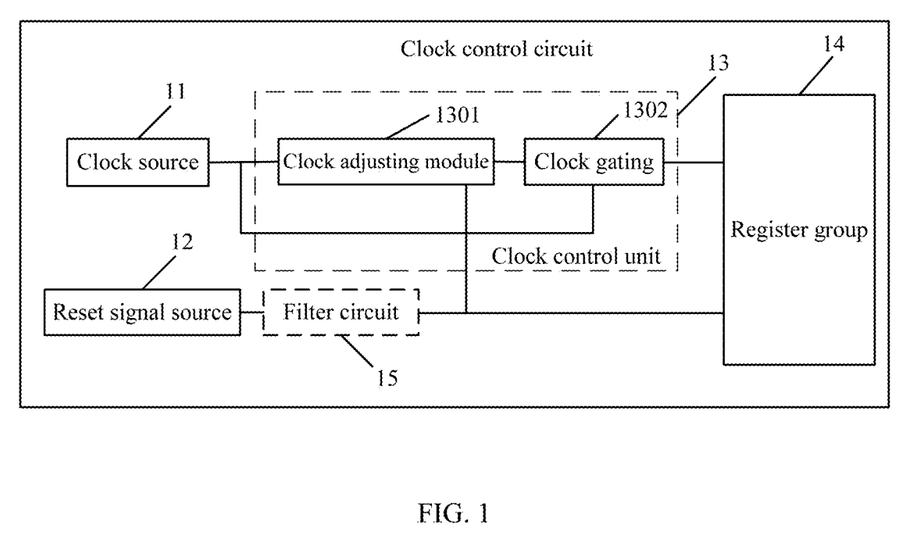
FIG. 1 is a schematic diagram of a clock control circuit in accordance with a first embodiment of the present disclosure.

FIG. 1 illustrates a schematic diagram of a clock control circuit in accordance with a first embodiment of the present disclosure. The clock control circuit includes a clock source 11, a reset signal source 12, a register group 14 and a clock control unit 13, the clock control unit 13 including a clock adjusting module 1301 and a clock gating 1302.

Furthermore, a first receiving end of the clock adjusting module 1301 is connected to the clock source 11, and a second receiving end of the clock adjusting module 1301 is connected to the reset signal source 12;

a data input end of the clock gating 1302 is connected to an output end of the clock adjusting module 1301, and a clock input end of the clock gating 1302 is connected to the clock source 11, and an output end of the clock gating 1302 is connected to one end of the register group 14;

the other end of the register group 14 connected to the reset signal source 12, wherein the register group includes at least two first registers;

specifically, after the clock adjusting module 1301 receives a reset signal output by the reset signal source 12, the clock adjusting module 1301 is configured to control the clock gating 1302 to adjust a first clock signal output by the clock source 11 to a second clock signal, after each first register of the register group 14 receiving the reset signal output by the reset signal source 12 and completed to be reset, and the clock adjusting module 1301 configured to control the clock gating 1302 to output the second clock signal to the register group 14.

In some feasible implementations, the clock adjusting module 1301 includes a data source and N second registers, wherein N is an integer greater than 1;

specifically, a clock input end of each second register connected to the clock source, and a reset signal input end of each second register connected to the reset signal source 12, a data input end of the first second register connected to the data source, a data input end of a second I-th register connected to a data output end of a (I−1)-th second register, a data output end of a N-th second register connected to a data input end of the clock gating 1302, wherein 1<I≤N.

In some feasible implementations, after the clock adjusting module 1301 receives the reset signal, the clock adjusting module 1301 is configured to reset the N second registers;

specifically, when a J-th second register is completed to be reset, the J-th second register is triggered by the first clock signal in a J-th clock cycle, data received by a data input end of the J-th second register is output from a data output end of the J-th second register to a data input end of a (J+1)-th second register, wherein 1≤J<N;

when a N-th second register is completed to be reset, the N-th second register is triggered by the first clock signal in a N-th clock cycle, data received by a data input end of the N-th second register is output from a data output end of the N-th second register to a data input end of the clock gating 1301.

In some feasible implementations, when the data input end of the clock gating 1301 receives the data output from the N-th second register, the clock gating 1301 is configured to take the first clock signal after the N-th clock cycle as the second clock signal and then output the second clock signal to the register group 14.

In some feasible implementations, the number N of the second register in the clock adjusting module 1301 is determined by a target duration that the reset signal is received by a target first register in the register group 14 and the target first register is completed to be reset, and a duration that the data output from the data source is transferred from the first second register to the N-th second register and then transferred from the N-th second register to the clock gating 1302 is not less than the target duration;

furthermore, the target first register is the first register in the register group with the longest duration that receives the reset signal and is completed to be reset, when the target first register is completed to be reset, the rest first registers of the register group 14 except the target first register is completed to be reset.

In some feasible implementations, the clock control circuit further includes a filter circuit 15;

a receiving end of the filter circuit 15 is connected to the reset signal source 12, a first output end of the filter circuit 15 is connected to the second receiving end of the clock adjusting module 1301, and the output end of the filter circuit 15 is connected to the other end of the register group 14;

specifically, after outputting the reset signal by the reset signal source 12, the filter circuit 15 is configured to eliminate burrs generated by the reset signal before and/or when the reset signal is powered on, to obtain the reset signal after the burrs are eliminated.

The clock control circuit provided by the embodiment of the present disclosure can perform a realization mode provided by the clock control circuit as shown in FIG. 1 through its built-in modules, in a specific implementation:

optionally, the clock source 11 can be configured to generate the first clock signal and other implementation methods. For details, please refer to implementation modes provided by the clock control circuit as shown in FIG. 1, which is not be repeated here.

Optionally, the reset signal source 12 can be configured to generate the reset signal and other implementation modes. For details, please refer to implementation modes provided by the clock control circuit as shown in FIG. 1, which is not be repeated here.

Optionally, the clock adjusting module 1301 can be configured to receive the reset signal output from the reset signal source 11 and other implementation modes. For details, please refer to implementation modes provided by the clock control circuit as shown in FIG. 1, which is not be repeated here.

Optionally, the clock gating 1302 can be configured to output the second clock signal to the register group 14 and other implementation modes. For details, please refer to implementation modes provided by the clock control circuit as shown in FIG. 1, which is not be described here.

Optionally, the register set 14 can be configured to receive the second clock signal and the reset signal and other implementation modes. For details, please refer to implementations provided by the clock control circuit as shown in FIG. 1, which is not be repeated here.

Optionally, after outputting the reset signal by the reset signal source 12, the filter circuit 15 can be configured to eliminate burrs generated by the reset signal before and/or when the reset signal is powered on, to obtain the reset signal after the burrs are eliminated, and other implementation modes. For details, please refer to implementations provided by the clock control circuit as shown in FIG. 1, which is not be repeated here.

In an embodiment of the present disclosure, the clock control unit is provided by the clock control circuit, the clock signal can be output to the register group after the register group in the control circuit are completed to be reset, therefore, it can solve a problem that a part of registers of the register group can't be reset completely within a single clock cycle due to inconsistency of a duration required for the reset signal to be transferred to each register in the conventional circuit, and avoid circuit logic error caused by difference of reset durations of a plurality of registers in the register group, and avoid circuit frequency reduction and power consumption increase, and have high applicability.

Figure 2:
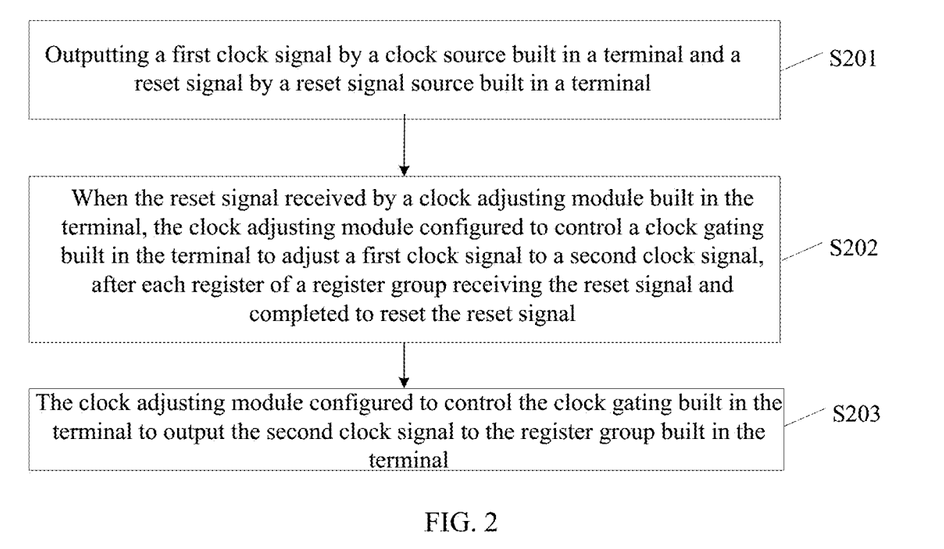
FIG. 2 is a flowchart of a clock control method in accordance with a first embodiment of the present disclosure.

FIG. 2 illustrates a flowchart of a clock control method in accordance with a first embodiment of the present disclosure. The clock control method includes the following steps S201-S203:

S201, outputting a first clock signal by a clock source built in the terminal, and outputting a reset signal by a reset signal source built in the terminal.

In some feasible implementations, the clock source 11 built in the terminal can be either an internal clock source or an external clock source, which is not limited here. At the same time, the internal clock source and/or the external clock source are not limited to a high speed or a low speed.

Taking a STM32F4 microprogrammed control unit (MCU) as an example, the STM32F4 MCU can provide an internal low-speed clock source with a frequency of about 32 kHz or 32.768 khz, as well as an internal high-speed clock source with a frequency of 16 MHz. In addition, an external high speed clock sources can also be received by PLL frequency doubling output.

In some feasible implementations, after outputting the reset signal by the reset signal source, eliminating burrs generated by the reset signal before and/or when the reset signal is powered on, to obtain the reset signal after the burrs are eliminated. In the process of generating the reset signal, a certain delay can be occurred when the reset signal source device passing through wires and logic units. The delay is related to a length of the wire and number of logic units and also affected by a manufacturing process, an operating voltage, a temperature and other conditions of devices. In this process, the burrs generated by the reset signal can affect stability of the reset signal and a normal operation of the circuit. In an embodiment of the present disclosure, the burrs in the reset signal can be eliminated by the filter circuit, and functions of the filter circuit can also be realized by software, which is not limited here.

Step S202, when the reset signal received by a clock adjusting module built in the terminal, the clock adjusting module configured to control a clock gating built in the terminal to adjust a first clock signal to a second clock signal, after each register of a register group built in the terminal receiving the reset signal and completed to be reset.

Figure 3:
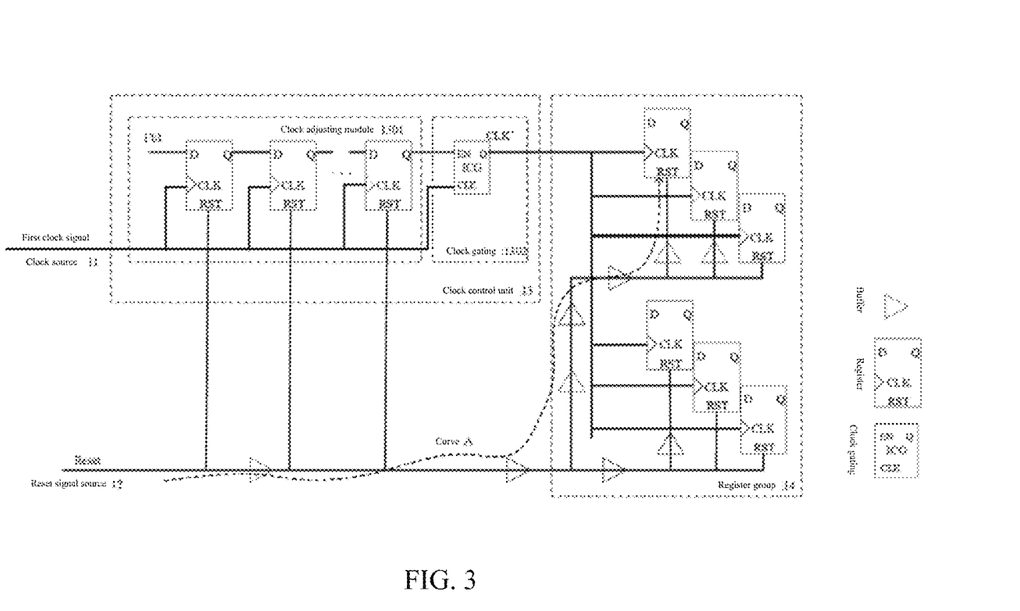
FIG. 3 is an internal circuit schematic diagram of a terminal including the clock control circuit in accordance with an embodiment of the present disclosure.

FIG. 3 illustrates an internal circuit schematic diagram of a terminal including the clock control circuit in accordance with an embodiment of the present disclosure. In FIG. 3, the clock control unit 13 includes the clock adjusting module 1301 and the clock gating 1302. The clock adjusting module 1301 is composed of N second registers and a data source connected in series, wherein N is an integer greater than 1.

A clock input end of each second register is connected to the clock source 11, and a reset signal input end of each second register is connected to the reset signal source 12, a data input end of a first second register is connected to the data source, a data input end of a I-th second register is connected to a data output end of a (I−1)-th second register, a data output end of a N-th second register is connected to a data input end of the clock gating, wherein 1<I≤N.

When the reset signal generated by the reset signal source 12 is 0, that is, the reset signal is in a low reset state, the terminal can reset all registers in the clock adjusting module 1301 via the reset signal. At this time, the clock gating 1302 is in a closed state. That is, the clock control unit 13 can't transmit clock signals to the register group 14 in the terminal, and each register of the register group 14 isn't work. After each register of the register group 14 are completed to be reset, at this point, the reset signal generated by the reset signal source 12 is 1 to be released, that is, the reset signal is in a high reset state, each register in the clock adjusting module 1301 and the register group 14 aren't controlled to be reset.

In some feasible implementations, when each register in the clock control module 1301 are reset, the data source in the clock control module 1301 is configured to output data to a first second register in the clock control module 1301. At the same time, the first clock signal is transferred successively to each second register in the clock adjusting module 1301 so as to trigger the each second register in the clock adjusting module 1301 to output received data. It is important to note that values of the data output from the data source can be determined based on an actual circuit scenario, which is not limited here.

When a J-th second register in the clock adjusting module 1301 is completed to be reset, the J-th second register is triggered by the first clock signal in a J-th clock cycle, at this point, the J-th second register is started to work. That is, data received by a data input end of the J-th second register is output from a data output end of the J-th second register to a data input end of a (J+1)-th second register, wherein 1≤J<N;

When a N-th second register is completed to be reset, the N-th second register is triggered by the first clock signal in a N-th clock cycle, data received by a data input end of the N-th second register is output from a data output end of the N-th second register to a data input end of the clock gating 1302. After the clock gating 1302 receives the data output from the N-th second register, the clock gating 1302 is configured to adjust the first clock signal to the second clock signal.

In combination with FIG. 3, in some feasible implementations, when the reset signal is 0, the register group 14 built in the terminal is configured to receive the reset signal and complete to reset each register of the register group 14. Otherwise, if each register of the register group 14 have not been reset completely, logic errors can be occurred in an actual circuit work in the terminal, resulting in increasing power consumption of the terminal.

It should be noted that the register group provided in FIG. 3 is only a representation of the register group 14 built in the terminal, different connection modes and number of registers in the register group 14 built in the terminal is determined by different functions of different terminals, which is not limited here. At the same time, clock tree structure composition and reset signal transmission paths can also have a variety of forms, which is not limited here.

In some feasible implementations, the number N of the second register in the clock adjusting module 1301 built in the terminal is determined by a target duration that the reset signal is received by a target first register in the register group 14 and the target first register is completed to be reset, and a duration that the data output from the data source is received by the N second registers and then transferred from the N second registers to the clock gating 1302 built in the terminal is not less than the target duration.

For example, a curve A shown in FIG. 3 is represented the longest transmission path that the reset signal is transferred to each first register in the register group 14, and the first register finally pointed to an end by the curve A is the target first register, the curve A with its final point to the first register is the target first register.

Specifically, when the reset signal is transferred along a path of the curve A to the target first register in the register group 14, and the target first register is completed to be reset under an action of a low reset signal, it is represented that each of the first registers in the register group 14 have been reset. At this point, after the clock gating 1302 receives data output by the N-th second register, the clock gating 1302 is configured to adjust the first clock signal to the second clock signal.

In some feasible implementations, since the number and the connection mode of each of the first registers in the register group 14 can't have a fixed representation under influence of different terminals and functions, therefore, in different clock control circuits, the number of the registers in the clock adjusting module 1301 can also be changed accordingly.

That is to say, when the second clock signal is controlled to output to the register group 14, the number of the registers in the clock adjusting module 1301 can be determined according to the target duration that the first register in the register group 14 receives the reset signal and is completed to be reset, so as to ensure that the clock gating 1302 is configured to adjust the first clock signal to the second clock signal, after each of the first registers in the register group 14 receives the reset signal and is completed to be reset.

Specifically, before the circuit works, first obtaining the target duration that the target first register of the register group 14 built in the terminal receives the reset signal and is completed to be reset; and then obtaining a transmission duration that one of the second registers in the clock adjusting module 132 receives the data output from the clock source 11 until the one of second registers outputs the data; determining the number N of the second registers in the clock adjusting module 1301 based on the target duration and the transmission duration; and wherein a duration that the data is received by the first second register in the clock adjusting module 1301 until the data is output by the N-th second register in the clock adjusting module 1301 is not less than the target duration.

For example, when the target duration is 10 ins and the transmission duration is 2 ins, it can be determined that the target duration is not greater than 5 transmission durations. At this time, there are 5 second registers in the clock adjusting module 1301. For another example, when the target duration is 10 ins and the transmission duration is 1.5 ins, it can be determined that the target duration is not greater than 7 transmission durations. At this time, there are 7 second registers in the clock adjusting module 1301.

Under a requirement of such duration, it can be ensured that when the second clock signal is transferred to the register group 14, each of the first registers in the register group 14 have been reset, and then the circuit can be returned to a normal working state.

In some feasible implementations, a certain number of buffers can be added in the register group 14 and between the register group 14 and the reset signal source 12 according to complexity and functional requirements of actual circuits, which can improve load capacity and driving capacity of circuits.

Optionally, although the buffer in the clock control circuit has no effect on states of the reset signal flowing through the buffer, the buffer within the clock control circuit can provide coordination between the clock control circuit and the terminal and/or peripherals. In addition, to realize synchronous transmission of the reset signals as far as possible, a certain number of buffers can be provided to effectively ensure a correct timing sequence of the signals in the circuit and improve stability of internal circuits of the terminal.

Optionally, since the buffer is an actual electrical element in the clock control circuit, when a large number of buffers are within the clock control circuit, transmission delay of the reset signal in the clock control circuit can be caused to a certain extent. Therefore, a delay duration caused by the buffers during transmission of the reset signal shall be fully considered in the duration that the reset signal is transferred to the registers in the register group.

Figure 4:
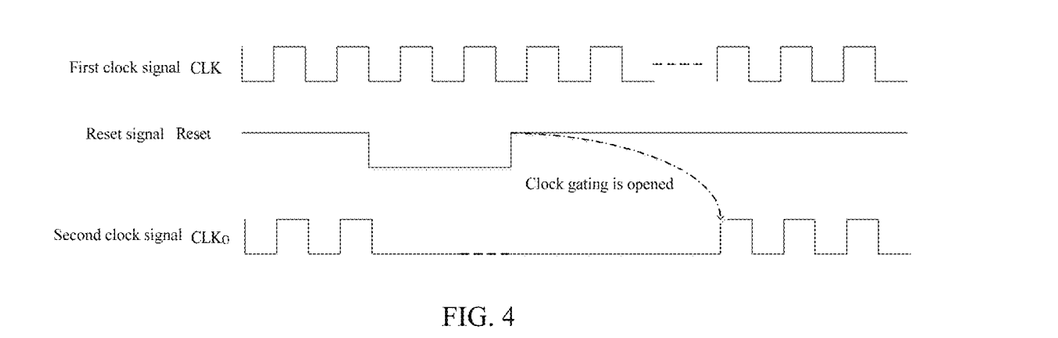
FIG. 4 is a sequence schematic diagram of the clock control circuit in accordance with an embodiment of the present disclosure.

FIG. 4 illustrates a sequence schematic diagram of the clock control circuit in accordance with a first embodiment of the present disclosure.

In a sequence diagram of the clock control circuit provided in an embodiment of the present disclosure, the first clock signal is continuously transferred after entering the clock control unit 13.

It can be seen from FIG. 4, a moment when the reset signal is changed from a low reset state to a high reset state, that is, the same moment when each of the registers in the register group have been reset completely, the clock gating is turned on to output the second clock signal to each of the registers in the register group and open a logical working state of the register group.

When the clock control circuit and the clock control method provided in the embodiments of the present disclosure are not used, since paths of the reset signal to different registers within the same register group are different, delay durations of the reset signal to different registers are also different, therefore, different registers in the same clock field can be reset at different times.

For example, for resetting a register A and a register B in the same register group, a path of signals to the register A is shorter and a longer path to the register B, so that the register A can be completed to be reset before the register B. Since it is not limited a moment that the clock signal begins to output the clock signal to the register group, the register begins to work normally after being reset. In the case that the register A and the register B are respectively completed to be reset at different times, so that the registers in the same register group can start working normally at different times, which can lead to abnormal logic functions within the circuit.

Step S203, the clock gating built in the terminal configured to output the second clock signal to the register group built in the terminal.

After each of the first registers in the register group 14 is reset completely, the clock gating 1302 is configured to transfer the second clock signal to the register group 14. At this time, the register group 14 can enter the working state after receiving the second clock signal.

It should be noted that the clock gating 1302 can realize a switching function under an action of the data being output from the data source, even if all registers in the register group 14 have been reset completely, the clock gating 1302 must first receive the data output from the data source and then can open a clock gate to output the second clock signal to the register group 14. In addition, the clock gating 1302 can not only realize the switching function to output the second clock signal to the register group 14, but also avoid a situation that the second clock signal is occurred signal reversal during being output to the register group 14. Therefore, it can avoid errors of circuit logic functions caused by a failure of synchronously working of the reversal signal received by each register in the register group 14.

In an embodiment of the present disclosure, by controlling an opening time of the clock gating in the clock control circuit, an output time, that the clock signal is transferred to the register group in the clock control circuit, can also be controlled, and then timing sequence change of the clock signal can be controlled when or after all registers in the control circuit are reset completely. It can avoid circuit logic error caused that the plurality of registers in the register group can't be reset completely in one clock cycle, and avoid circuit frequency reduction and power consumption increase, and have high applicability.

A terminal according to an embodiment of the present disclosure is provided. The terminal includes the clock control circuit provided in the above embodiments of the present disclosure, and configured to perform a clock control method provided in the embodiments of the present disclosure.

Figure 5:
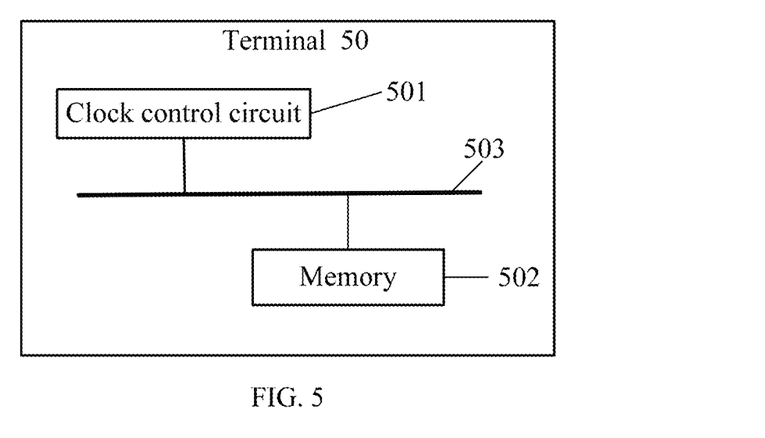
FIG. 5 is a schematic diagram of the terminal in accordance with an embodiment of the present disclosure.

FIG. 5 illustrates a schematic diagram of the terminal in accordance with an embodiment of the present disclosure.

Referring to FIG. 5, the terminal of the embodiment of the present disclosure can include: a clock control circuit 501 and a memory 502 connected to the clock control circuit 501 by a bus 503. The memory 502 is configured to store computer programs including program instructions, and the clock control circuit 501 is configured to perform the program instructions stored in the memory 502. The following operations are performed:

outputting a first clock signal by a clock source built in the clock control circuit 501 and outputting a reset signal by a reset signal source built in the clock control circuit 501;

when a reset signal received by a clock adjusting module built in the clock control circuit 501, the clock adjusting module configured to control a clock gating built in the clock control circuit 501 to adjust a first clock signal to a second clock signal; and after each register of a register group built in the terminal receiving the reset signal and completed to be reset;

the clock adjusting module configured to control the clock gating built in the clock control circuit 501 to output the second clock signal to the register group built in the clock control circuit 501.

In some feasible implementations, when the clock gating built in the clock control circuit 501 receives data output by the clock adjusting module built in the clock control circuit 501, the clock gating built in the clock control circuit 501 is configured to take the first clock signal as the second clock signal and then output to the register group built in the clock control circuit 501;

furthermore, the clock adjusting module built in the clock control circuit 501 includes a data source, and N second registers configured to receive data output from the data source and then output the data to the clock gating, wherein N is an integer greater than 1.

In some feasible implementations, the number N of the second register in the clock adjusting module built in the clock control circuit 501 is determined by a target duration that the reset signal is received by a target first register in the register group and the target first register is completed to be reset, and a duration that the data output from the data source is received by the N second registers and then transferred from the N second registers to the clock gating built in the clock control circuit 501 is not less than the target duration;

furthermore, the target first register is the first register in the register group with the longest duration that receives the reset signal and is completed to be reset, when the target first register is completed to be reset, the rest first registers of the register group except the target first register is completed to be reset.

In a feasible implementation, the clock control circuit 501 is further configured to:

obtain the target duration that the reset signal is received by the target first register of the register group built in the clock control circuit 501 and the target first register completed to be reset;

obtain a transmission duration that the data received by one of the second registers of the clock adjusting module built in the clock control circuit 501 and then output by the one of the second registers;

determine the number N of the second registers in the clock adjusting module built in the clock control circuit 501 based on the target duration and the transmission duration; and wherein a duration that the data from being received by a first second register in the clock adjusting module built in the clock control circuit 501 to output by a N-th second register in the clock adjusting module built in the clock control circuit 501 is not less than the target duration.

In an embodiment of the present disclosure, the terminal provided in the embodiments of the present disclosure can be any terminal including the clock control circuit provided in the embodiments of the present disclosure and/or used to perform the clock control method provided in the embodiments of the present disclosure. The terminal can be configured to solve a problem that the registers of the register group within internal circuits of a conventional terminal can't be reset completely in one clock cycle, and avoid circuit logic error caused by difference of reset durations of a plurality of registers in the register group, and avoid circuit frequency reduction and power consumption increase, and have high applicability.

A computer readable storage medium according to an embodiment of the present disclosure is configured to store computer programs, the computer programs including instructions, the instructions performed by a terminal to implement the circuits and/or the methods provided in the steps of FIG. 1 and FIG. 2, an implementation is provided in each of the above steps for details, which is not repeated here.

Optionally, the computer readable storage medium can be the clock control circuit provided by any of the foregoing embodiments or an internal storage unit of the terminal, such as a hard disk or a memory of an electronic device. The computer readable storage medium can also be an external storage device of the electronic device, such as a plug-in hard disk, a smart media card (SMC), a secure digital (SD) card, a flashcard, etc., positioned on the electronic device. The computer readable storage medium can also include a disk, a compact disc (CD), a storage of read-only memory (read-only memory, ROM) or a stochastic storage memory (random access memory, RAM), etc. Furthermore, the computer readable storage medium can also include both the internal storage unit of the electronic device and the external storage device. The computer readable storage medium can be used to store computer programs and other programs and data required by the electronic device. The computer readable storage medium can also be used to temporarily store data that has been or will be output.

What is claimed is:

1. A clock control circuit comprising a clock source, a reset signal source, a register group and a clock control unit, the clock control unit comprising a clock adjusting module and a clock gating;

a first receiving end of the clock adjusting module connected to the clock source, and a second receiving end of the clock adjusting module connected to the reset signal source; a data input end of the clock gating connected to an output end of the clock adjusting module, a clock input end of the clock gating connected to the clock source, an output end of the clock gating connected to one end of the register group, and the other end of the register group connected to the reset signal source, wherein the register group comprises a plurality of first registers;

after the clock adjusting module receives a reset signal output by the reset signal source, the clock adjusting module configured to control the clock gating to adjust a first clock signal to a second clock signal; and after each of the plurality of first registers of the register group receiving the reset signal output by the reset signal source and completed to be reset, the clock adjusting module configured to control the clock gating to output the second clock signal to the register group.

2. The clock control circuit as claimed in claim 1, wherein the clock adjusting module comprises a data source and N second registers, wherein N is an integer greater than 1;

a clock input end of each second register connected to the clock source, and a reset signal input end of each second register connected to the reset signal source, a data input end of a first second register connected to the data source, a data input end of a I-th second register connected to a data output end of a (I−1)-th second register, a data output end of a N-th second register connected to the data input end of the clock gating, wherein 1<I≤N.

3. The clock control circuit as claimed in claim 2, wherein after the clock adjusting module receives the reset signal, the clock adjusting module is configured to reset the N-th register;

when a J-th second register is completed to be reset, the J-th second register is triggered by the first clock signal in a J-th clock cycle, data received by a data input end of the J-th second register is output from a data output end of the J-th second register to a data input end of the (J+1)-th second register, wherein $1 \leq J < N$;

when a N-th second register is completed to be reset, the N-th second register is triggered by the first clock signal in a N-th clock cycle, data received by a data input end of the N-th second register is output from a data output end of the N-th second register to the data input end of the clock gating.

4. The clock control circuit as claimed in claim 3, wherein when the data input end of the clock gating receives the data output from the N-th second register, the clock gating is configured to take the first clock signal after the N-th clock cycle as the second clock signal and output the second clock signal to the register group.

5. The clock control circuit as claimed in claim 3, wherein the number N of the second register in the clock adjusting module is determined by a target duration that the reset signal is received by a target first register in the register group and the target first register is completed to be reset, and a duration that the data output from the data source is transferred from the first second register to the N-th second register and then transferred from the N-th second register to the clock gating is not less than the target duration; and wherein the target first register is the first register in the register group with the longest duration that receives the reset signal and is completed to be reset, when the target first register is completed to be reset, the rest first registers of the register group except the target first register completed to be reset.

6. The clock control circuit as claimed in claim 5, wherein the clock control circuit further comprises a filter circuit, a receiving end of the filter circuit connected to the reset signal source, an output end of the filter circuit connected to the second receiving end of the clock adjusting module, and the output end of the filter circuit further connected to the other end of the register group; and after outputting the reset signal by the reset signal source, the filter circuit configured to eliminate burrs generated by the reset signal before and/or when the reset signal is powered on, to obtain the reset signal after the burrs are eliminated.

7. A clock control method applied to a terminal comprising a clock control circuit as claimed in claim 1, the method comprising:

outputting a first clock signal by a clock source built in the terminal, and outputting a reset signal by a reset signal source built in the terminal;

when the reset signal received by a clock adjusting module built in the terminal, the clock adjusting module configured to control a clock gating built in the terminal to adjust a first clock signal to a second clock signal; and after each register of a register group built in the terminal receiving the reset signal and completed to be reset;

the clock adjusting module configured to control the clock gating built in the terminal to output the second clock signal to the register group built in the terminal.

8. The clock control method as claimed in claim 7, wherein the step of the clock gating built in the terminal configured to output the second clock signal to the register group built in the terminal comprises:

after the clock gating built in the terminal receives data output by the clock adjusting module built in the terminal, the clock gating built in the terminal configured to take the first clock signal as the second clock signal and output the second clock signal to the register group built in the terminal;

the clock adjusting module built in the terminal comprising a data source, and N second registers configured to receive data output from the data source and then output the data to the clock gating, wherein N is an integer greater than 1.

9. The clock control method as claimed in claim 7, wherein the number N of the second register in the clock adjusting module built in the terminal is determined by a target duration that the reset signal is received by a target first register in the register group and the target first register is completed to be reset, and a duration that the data output from the data source is received by the N second registers and then transferred from the N second registers to the clock gating built in the terminal is not less than the target duration; and wherein the target first register is the first register in the register group with the longest duration that receives the reset signal and is completed to be reset, when the target first register is completed to be reset, the rest first registers of the register group except the target first register is completed to be reset.

10. The clock control method as claimed in claim 9, wherein the method further comprises:

obtaining the target duration that the reset signal is received by the target first register of the register group built in the terminal and completed to be reset;

obtaining a transmission duration that the data received by one of the second registers of the clock adjusting module built in the terminal and then output by the one of the second registers;

determining the number N of the second registers in the clock adjusting module based on the target duration and the transmission duration; and wherein a duration that the data from being received by a first second register in the clock adjusting module to output by a N-th second register in the clock adjusting module is not less than the target duration.

\* \* \* \* \*